Patented May 18, 1937

2,080,689

UNITED STATES PATENT OFFICE 2,080,689

PROCESS FOR PRODUCING A BITUMINOUS EMULSION

Ulric B. Bray and Lawton B. Beckwith, Palos Verdes Estates, Calif., assignors to Union Oil Company of California, Los Angeles, Calif., a corporation of California No Drawing. Application March 30, 1934, Serial No. 718,213

2 Claims. (Cl. 134—1)

The present invention relates to aqueous emulsions of bitumen or asphalt, pitch, tar and tar-like substances, resins and other bituminous substances of natural or artificial origin and to a process for making the same. Such emulsions are suitably employed as binders, adhesives and coating compositions and are more particularly employed in road building by the cold laying process or by the so-called "penetration method" which consists essentially in spraying, pouring or pumping the asphalt emulsion upon the mineral aggregate on the road bed. Roads are also built by premixing the emulsion with the aggregate and then spreading the mixture on the road bed which is followed by tamping and rolling; or the emulsion may be mixed in place; or the emulsion may be blade mixed with the aggregate in place, i. e. on the road bed.

In our co-pending application Ser. No. 718,212 we described a process for producing a stable asphalt emulsion having a fine particle size and a high degree of stability against settling or creaming in storage. Said process comprises in producing a primary emulsion by first melting the asphalt and then emulsifying the melted asphalt with a dilute solution of caustic alkali or other material capable of emulsifying the melted asphalt. An organic type stabilizer such as casein was then added to this primary emulsion. In the above mentioned application, we stressed the importance of cooling the primary emulsion to a temperature of approximately 85 to 95° F. before the incorporation of the stabilizing agent into the primary dispersion of asphalt and alkaline water.

We now have discovered that alkaline salts such as sodium carbonate, sodium phosphate, sodium phenate, sodium cresolate, sodium borate or other alkaline salts may be employed as stabilizers for the primary emulsion. However, we have discovered that it is not absolutely necessary to cool the primary and fine grained emulsion when adding the alkaline salt stabilizer as when the organic type of stabilizer is used. However, we have discovered that it is quite necessary to employ unusually thorough agitation along with the addition of the alkaline salts, particularly when they are added in solid form or in rather concentrated solutions. This is to prevent local breakdown of the emulsion which may occur due to excessive temporary local concentration of stabilizing agent.

It is, therefore, an object of our invention to produce stable emulsions by the addition of alkaline salts to primary fine grained emulsions produced by dispersing melted asphalt in an aqueous alkaline solution. It is an important object of the invention to incorporate a stabilizing agent of the alkaline salt type by employing unusually thorough agitation.

Various other objects and advantages of the invention will become apparent to those skilled in the art from the description of the preferred manner of compounding the preferred composition which is given herein for the purpose of illustrating and explaining the invention and which is not to be considered as limiting.

For example, a primary fine grained emulsion is first produced by emulsification with caustic soda alone, by heating approximately 60% by weight of asphalt of 200 penetration at 77° F. (A. S. T. M.—Method D-5-25) produced from Poso Creek residuum to a temperature of approximately 320° F. after which the melted asphalt is passed through a mixing device in which approximately 40% of caustic soda solution containing 0.30 to 0.35% of caustic soda by weight is intimately mixed with melted asphalt. Agitation by circulating the emulsion through the mixing device is continued until the asphalt is finally dispersed into the caustic soda solution. The emulsion as produced by the aforesaid process comprises one containing a fine particle size and is of the quick breaking type. To this emulsion is then added, either while the emulsion is hot or cooled to a temperature of approximately 85 to 95° F., a small percentage of an alkaline salt type stabilizing agent such as, for example, 0.7 of sodium phenate, sodium carbonate or sodium borate. The amount of stabilizing agent may vary between 0.5 to 2%. It may be added either in solid form or as a solution of 10 parts water to one part by weight of the solid stabilizer.

The addition of the stabilizing agent to the primary dispersion is accompanied by unusually thorough agitation and as a means of accomplishing this any desired and known method may be followed. We have effected unusually thorough agitation and incorporation of the alkaline salt into the primary emulsion by mixing in a circulating centrifugal type pump. The alkaline salt is introduced into the primary dispersion at a point adjacent the suction of the mixing and circulating pump and the mixture is continuously recirculated through the pump until the alkaline salt is thoroughly distributed throughout the primary emulsion.

Instead of employing sodium hydroxide as the emulsifying agent for the melted asphalt to produce the primary emulsion, we may employ other alkaline materials such as potassium hydroxide, sodium or potassium carbonate and the like; or we may emulsify the asphalt with a soap solution containing such soaps as potassium oleate or resinate, sodium stearate, sodium palmitate or soaps of fish oil or coconut oil; or if desired we may form the primary emulsion with a mixture of an alkali and an alkaloid, pyridine, piccolin or chinolin base.

The foregoing exemplary description of our invention is not considered as limiting since many variations may be made within the scope of the following claims by those skilled in the art without departing from the spirit thereof.

We claim:

1. A process for producing bituminous emulsions of the slow breaking type which comprises melting bitumen, mixing said melted bitumen in a heated condition with an aqueous solution containing a small amount of caustic alkali to produce an emulsion of the quick breaking type, passing said quick breaking emulsion through a centrifugal pump and injecting regulated quantities of an alkaline alkali metal salt into said quick breaking emulsion for stabilizing said quick breaking emulsion, said injection being at a point adjacent the suction of said centrifugal pump whereby said alkaline alkali metal salt is thoroughly distributed throughout and intimately commingled with said quick breaking emulsion without effecting local breakdown of said quick breaking emulsion, and whereby an aqueous emulsion of the slow breaking type is produced.

2. A process for producing aqueous bituminous emulsions of the slow breaking type which comprises melting bitumen, mixing said melted bitumen in a heated condition with an aqueous solution of caustic alkali, containing approximately 0.30% to 0.35% by weight of said caustic, to produce a fine grained dispersion of the quick breaking type, passing said primary dispersion through a centrifugal pump and injecting regulated quantities of an alkaline salt selected from the class consisting of sodium carbonate, sodium sulfate, sodium phenate, sodium cresolate and sodium borate, into said primary dispersion at a point adjacent the suction of said centrifugal pump whereby said alkaline salt is thoroughly distributed throughout and intimately commingled with said primary dispersion without effecting local breakdown of said primary dispersion, and whereby an aqueous emulsion of the slow breaking type is produced.

ULRIC B. BRAY.
LAWTON B. BECKWITH.